(12) United States Patent
Jang

(10) Patent No.: US 6,993,164 B2
(45) Date of Patent: Jan. 31, 2006

(54) FINGERPRINT IMAGE ACQUISITION APPARATUS AND METHOD THEREOF

(75) Inventor: Dong Hyuk Jang, Seoul (KR)

(73) Assignee: Testech, Inc., Chunan-si (KR)

( * ) Notice: Subject to any disclaimer, the term of this patent is extended or adjusted under 35 U.S.C. 154(b) by 659 days.

(21) Appl. No.: 10/073,927

(22) Filed: Feb. 14, 2002

(65) Prior Publication Data

US 2002/0110265 A1     Aug. 15, 2002

(30) Foreign Application Priority Data

Feb. 14, 2001  (KR) ........................... 2001-0007358

(51) Int. Cl.
*G06K 9/00*     (2006.01)

(52) U.S. Cl. .................... 382/124; 382/299; 340/5.83; 902/3

(58) Field of Classification Search ........ 382/124–127, 382/173; 356/71
See application file for complete search history.

(56) References Cited

U.S. PATENT DOCUMENTS

| | | | | |
|---|---|---|---|---|
| 5,054,090 A | * | 10/1991 | Knight et al. ................ | 382/127 |
| 5,117,294 A | * | 5/1992 | Yano ........................... | 358/447 |
| 5,261,008 A | * | 11/1993 | Yamamoto ................... | 382/127 |
| 6,289,112 B1 | | 9/2001 | Jain et al. .................... | 382/116 |
| 6,707,934 B1 | * | 3/2004 | Takeda et al. .............. | 382/124 |

* cited by examiner

*Primary Examiner*—Samir Ahmed
*Assistant Examiner*—Charles Kim
(74) *Attorney, Agent, or Firm*—Fleshner & Kim LLP

(57) ABSTRACT

A fingerprint image acquisition apparatus of the present invention includes fingerprint sensing device unit, a CCD device unit, and an image processing unit, the image processing unit comprising: an A/D converting unit for converting and outputting the fingerprint image outputted from the CCD device unit into a digital signal; an image buffer for storing the digital signal from the A/D converting unit; a controller for watching a state of the image buffer, i.e., whether the fingerprint image is inputted and stored to the image buffer, and storing the fingerprint image to a video memory if the storage of the fingerprint image is confirmed; a process executed by the controller, for dividing the fingerprint image into a plurality of unit blocks with a predetermined size; and a process executed by the controller, for dividing the fingerprint image as a center region and a peripheral region, each including a predetermined number of unit blocks, and subdividing the unit block of the center region into at least two or more subdivided blocks.

16 Claims, 14 Drawing Sheets

FIG. 6

| 0 | 1 | 2 | 3 | 4 | 5 | 6 | 7 |
|---|---|---|---|---|---|---|---|
| 8 | 9 | 0  1  2  3  4  5  6  7  8  9  10 11 | | | | | |
|   |   | 12 13 14 15 16 17 18 19 20 21 22 23 | | | | | |
| 16 | 17 | 0  1  2  3  4  5  6  7  8  9  10 11 | | | | | |
|    |    | 12 13 14 15 16 17 18 19 20 21 22 23 | | | | | |
| 24 | 25 | 24 25 26 27 28 29 30 31 32 33 34 35 | | | | | |
|    |    | 36 37 38 39 40 41 42 43 44 45 46 47 | | | | | |
| 32 | 33 | 24 25 26 27 28 29 30 31 32 33 34 35 | | | | | |
|    |    | 36 37 38 39 40 41 42 43 44 45 46 47 | | | | | |
| 40 | 41 | 42 | 43 | 44 | 45 | 46 | 47 |

FINGERPRINT IMAGE ACQUISITION APPARATUS AND METHOD THEREOF

BACKGROUND OF THE INVENTION

1. Field of the Invention

The present invention relates to a fingerprint image acquisition apparatus and method thereof, and more particularly, to a fingerprint image acquisition apparatus and method thereof which can acquire a fingerprint image by dividing the region of ridges having narrow interval, when acquiring the fingerprint image formed on the finger, by using a contacting type fingerprint image acquisition apparatus.

2. Description of the Related Art

As a personal computer and a communication network supplies rapidly, there increased the requirements of identification procedures in person in various fields, such as an authorization and permission in public office, an entrance and exit control of special region in which the preservation of public peace is required, an electronic commerce by using a credit card, receipt of money and drawing in a bank. In the procedure of confirming one's identity, although a security system using security devices such as a key, an ID card, and a secret number etc. is used, it has several problems that the key, ID card, and the secret number is easy to make a copy or likely to lose.

To prevent the above security devices from copying or losing, recently, a living body measurement security apparatus has been developed and supplied. In the living body measurement security apparatus, the one's identity is confirmed by using various living bodies such as a fingerprint, palm, eyes, face and voice etc. as the unique body character of human. Accordingly, it is prevented the accidents caused by copying or losing the several security devices originally.

Hereinafter, as a conventional method for confirming one's identity, the method for acquiring a fingerprint formed on a finger will be described. FIG. 1 is a side view illustrating a fingerprint image acquisition apparatus in accordance with the conventional art. FIG. 2 is a view illustrating a dividing state of a fingerprint image generated from the fingerprint image acquisition apparatus shown in FIG. 1. As shown in FIGS. 1 and 2, the fingerprint image acquisition apparatus 1 comprises a fingerprint sensing device unit 2, a lens 3 and a CCD (Charge Coupled Device) device unit 4. Here, the fingerprint sensing device unit 2 changes the image of ridge and valley of a fingerprint fp, formed on a finger f, when contacting the finger f with it, into a photo signal and then outputs. Accordingly, all devices capable of performing the above function can be adapted to the fingerprint sensing device unit 2.

More in detail, when a user's finger is contacted with the fingerprint sensing device unit 2 with a predetermined pressing pressure, the fingerprint sensing device unit 2 changes the formation of the fingerprint fp formed on the finger into a photo signal and then generates.

The photo signal generated from the fingerprint sensing device unit 2 is transmitted to the CCD device unit 4 through the lens 3. The lens 3 controls the photo signal to be focused on a surface of the CCD device unit 4. The CCD device unit 4 changes the irradiated photo signal into an electrical signal and then outputs it, thereby outputting a fingerprint image. The fingerprint image outputted from the CCD device unit is stored to a video memory (not shown). The gray level of the fingerprint image, which is stored to the video memory, is divided as 256 levels. Among those, gray levels of 0 to 5 are noises and only gray levels of 60% above are acquired and stored to the video memory.

When storing the fingerprint image to the video memory, the fingerprint image acquired from the CCD device unit 4 is stored by dividing it into a plurality of unit block B as shown in FIG. 2. FIG. 3 is a view illustrating a fingerprint image stored to the video memory. As shown in FIG. 2, a fingerprint image is divided into the size of 8×6, thereby acquiring 48 unit blocks B. To acquire more precise image, the fingerprint image outputted from the CCD device unit is divided into the size of 192×192 and stored. Thereafter, the image stored to the video memory is compared to a previously stored fingerprint image, thereby confirming one's identity.

As described above, the conventional fingerprint image acquisition method has a problem that when the fingerprint image is acquired by dividing it into unit blocks with a constant size regardless of the width of ridges of the fingerprint formed on a finger, as shown in FIG. 3, the fingerprint image acquisition states become different at a region having narrow interval between the ridges and at another regions, especially, a clear fingerprint image can not obtained at the region having narrow interval between the ridges.

SUMMARY OF THE INVENTION

It is, therefore, an object of the present invention to provide a fingerprint image acquisition apparatus which subdivides the unit block of a center region after dividing the dense region of ridges of the fingerprint image into the center region and a peripheral region and stores it to a video memory, thereby obtaining more clear fingerprint image.

It is another object of the present invention to provide a fingerprint image acquisition method which subdivides the unit block of a center region after dividing the dense region of ridges of the fingerprint image into the center region and a peripheral region and stores it to a video memory, thereby obtaining more clear fingerprint image.

To achieve the above objects, there is provided a fingerprint image acquisition apparatus including a fingerprint sensing device unit, a CCD device unit, and an image processing unit, the image processing unit comprising: an A/D converting unit for converting and outputting the fingerprint image outputted from the CCD device unit into a digital signal; an image buffer for storing the digital signal from the A/D converting unit; a controller for watching a state of the image buffer, i.e., whether the fingerprint image is inputted and stored to the image buffer, and storing the fingerprint image to a video memory if the storage of the fingerprint image is confirmed; a process executed by the controller, for dividing the fingerprint image into a plurality of unit blocks with a predetermined size; and a process executed by the controller, for dividing the fingerprint image as a center region and a peripheral region, each including a predetermined number of unit blocks, and subdividing the unit block of the center region into at least two or more subdivided blocks.

Also, there is provided a fingerprint image acquisition apparatus including a fingerprint sensing device unit, a CCD device unit, and an image processing unit, the image processing unit comprising: an A/D converting unit for converting and outputting the fingerprint image outputted from the CCD device unit into a digital signal; an image buffer for storing the digital signal from the A/D converting unit; a controller for watching a state of the image buffer, i.e., whether the fingerprint image is inputted and stored to the image buffer, and storing the fingerprint image to a video memory if the storage of the fingerprint image is confirmed;

a process executed by the controller, for setting a size of the fingerprint image frame; a process executed by the controller, for dividing the fingerprint image into a plurality of unit blocks with a predetermine size; a process executed by the controller, for setting a section of predetermined subdivided blocks; a process executed by the controller, for dividing the fingerprint image into a predetermined size of center region including a predetermined number of unit blocks; and a process executed by the controller, for dividing the fingerprint image into a peripheral region including a predetermined number of unit blocks.

Also, there is provided a fingerprint image acquisition method comprising the steps of: confirming whetehr the fingerprint image generated by contacting a finger on a surface of a fingerprint sensing device unit is inputted and stored to an image buffer; dividing the fingerprint image into a predetermined number of unit blocks if it is confirmed that the fingerprint image is stored to the image buffer; setting the divided fingerprint image into a center region and a peripheral region, each region having a predetermined number of unit blocks, and subdividing the respective unit blocks of the center region into a predetermined number of subdivided blocks; thereby obtaining the differentiated images at the center region and the peripheral region.

Also, there is provided a fingerprint image acquisition method comprising the steps of: confirming whether the fingerprint image generated by contacting a finger on a surface of a fingerprint sensing device unit is inputted and stored to an image buffer; setting a size of a fingerprint image frame if it is confirmed that the fingerprint image is stored to the image buffer; dividing the fingerprint image into a plurality of unit blocks with a predetermined size; setting a predetermined subdivided block section; dividing the fingerprint image into a predetermined size of center region including a predetermined number of unit blocks; dividing the fingerprint image into a peripheral region including a predetermined number of unit blocks.

BRIEF DESCRIPTION OF THE DRAWINGS

The above objects, features and advantages of the present invention will become more apparent from the following detailed description when taken in conjunction with the accompanying drawings, in which:

FIG. 6 is a view illustrating a dividing state of a fingerprint image generated from the fingerprint image acquisition apparatus of FIG. 4;

DETAILED DESCRIPTION OF THE PREFERRED EMBODIMENT

A preferred embodiment of the present invention will now be described with reference to the accompanying drawings.

Figure 1:
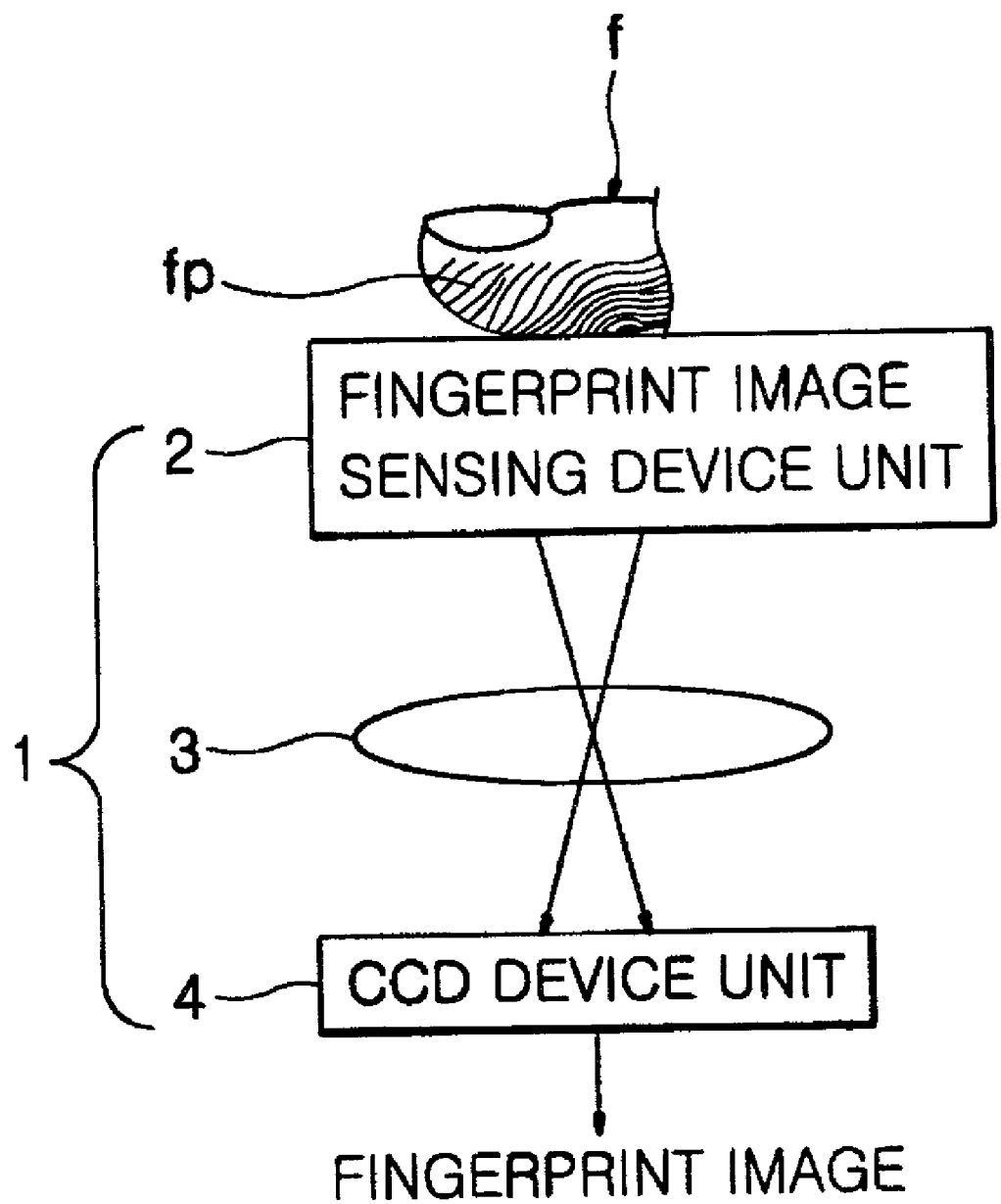
FIG. 1 is a side view illustrating a fingerprint image acquisition apparatus in accordance with the conventional art.
Figure 2:
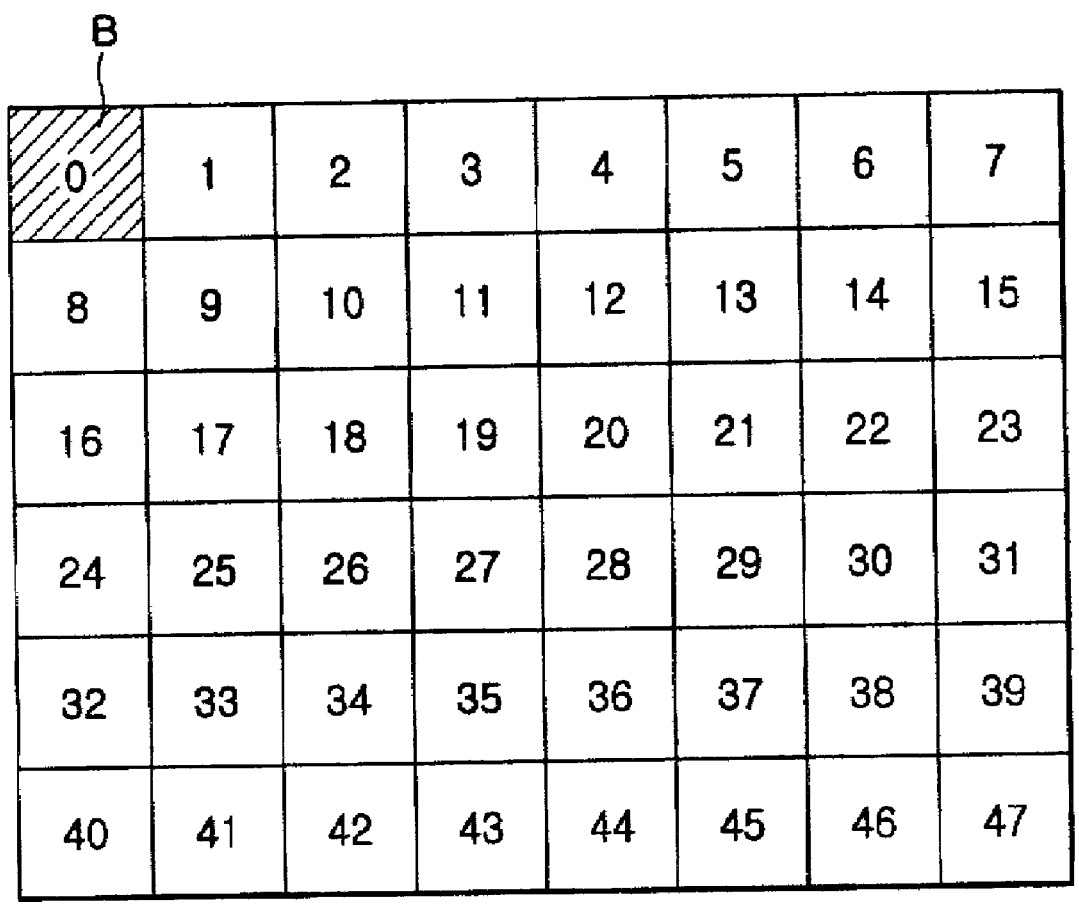
FIG. 2 is a view illustrating a dividing state of a fingerprint image generated from the fingerprint image acquisition apparatus of FIG. 1.
Figure 3:
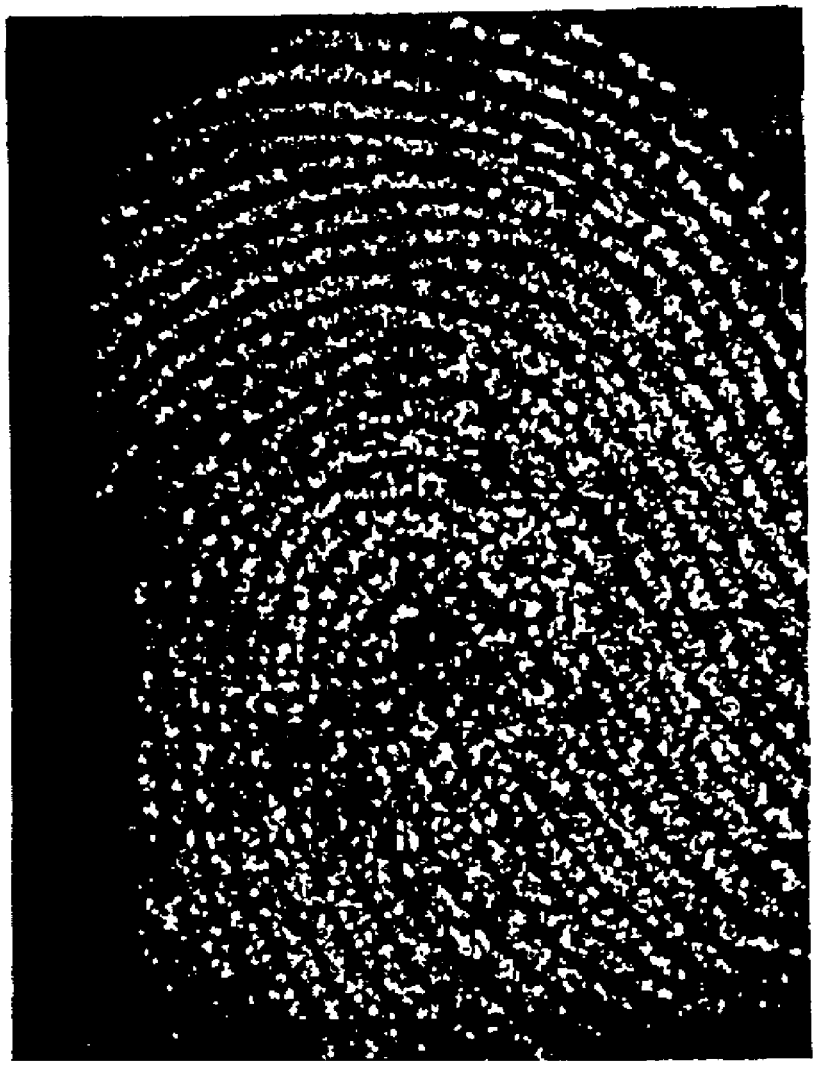
FIG. 3 is a photograph acquired by using a method for dividing of the fingerprint image of FIG. 2.
Figure 4:
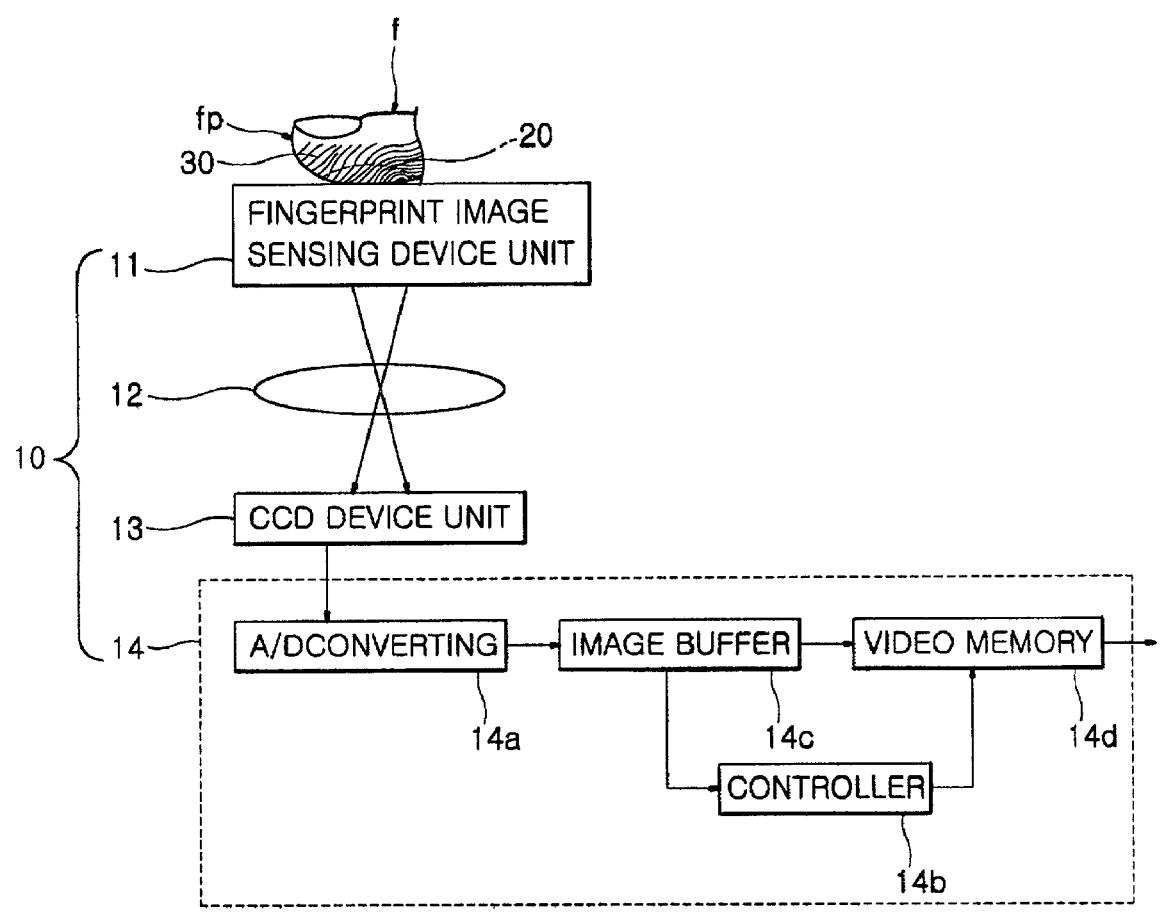
FIG. 4 is a block diagram illustrating a fingerprint image acquisition apparatus in accordance with the present invention.
Figure 5:
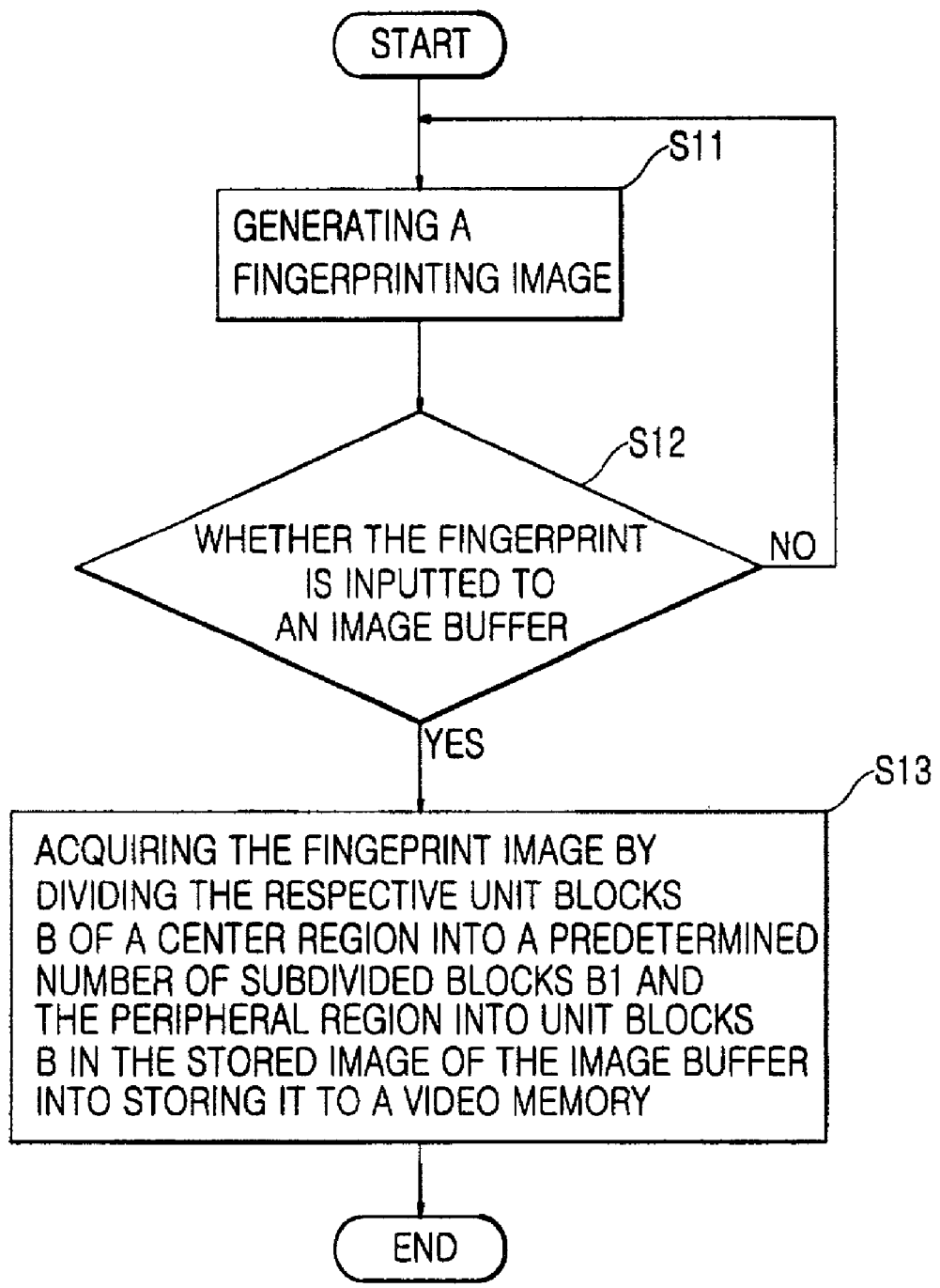
FIG. 5 is a flow chart illustrating the method for acquiring the fingerprint image by using a fingerprint image acquisition apparatus of FIG. 4.

FIG. 4 is a block diagram illustrating a fingerprint image acquisition apparatus in accordance with the present invention, FIG. 5 is a flow chart illustrating the method for acquiring the fingerprint image by using a fingerprint image acquisition apparatus of FIG. 4, and FIG. 6 is a view illustrating a dividing state of a fingerprint image generated from the fingerprint image acquisition apparatus of FIG. 4.

As shown in FIGS. 4 to 6, a fingerprint image acquisition method comprises a step for generating a fingerprint image to a CCD device unit 13 by contacting the finger f on a surface of a fingerprint image sensing device unit 11 of a fingerprint image acquisition device 10 (S11), a step for confirming the fingerprint image whether it is inputted to an image buffer 14c by a controller 14b when the fingerprint image is generated from the CCD device unit 13 and outputted (S12), a step for acquiring the fingerprint image by dividing the respective unit blocks B of a center region 20 into a predetermined number of subdivided blocks B1 and the peripheral region into unit blocks B in the stored image of the image buffer 14c into, storing it to a video memory 14d, thereby acquiring the fingerprint image when it is confirmed that the fingerprint image is inputted and stored to the image buffer 14c (S13).

A construction and an operation of the present invention will be described as follows in detail.

A fingerprint image acquisition device 10 comprises a fingerprint sensing device unit 11, a lens 12, a CCD device unit 13 and an image processing unit 14. Here, the fingerprint sensing device unit 11 changes the image of ridges and valleys of a fingerprint fp, formed on a finger f, when contacting the finger f with it, into a photo signal and then outputs. Accordingly, all devices capable of performing the above function can be adapted to the fingerprint sensing device unit 11.

More in detail, a user's finger is contacted with the fingerprint sensing device unit 11 with a predetermined pressing pressure, the fingerprint sensing device unit 11 changes the formation of the fingerprint fp formed on the finger into a photo signal and then generates.

The photo signal generated from the fingerprint sensing device unit 11 is transmitted to a lens 12. The transmitted photo signal is penetrated to the lens 12 and the irradiated to the CCD device unit 13. The CCD device unit 13 changes the irradiated photo signal into an electrical signal and then outputs it, thereby generating a fingerprint image (S11). The gray level of the fingerprint image, which is acquired from the CCD device unit 13, is divided as 256 levels. Among those, gray levels of 0 to 5 are noises and only gray levels of 60% above are acquired.

The fingerprint image generated from the CCD device unit 13 is transmitted to an image processing unit 14. The image processing unit 14 comprises an A/D (Analog to digital converter) converting unit 14a, a controller 14b, an image buffer 14c and a video memory 14d. The A/D converting unit 14a converts the fingerprint image generated from the CCD device unit 13 into a digital signal and then inputs it to the image buffer 14c (S12).

The controller 14b watches a state of the image buffer, i.e., whether the fingerprint image is inputted to the image buffer 14c and stored, and then stores the fingerprint image to the video memory 14d if the storage of the fingerprint image is confirmed. When storing the fingerprint image, the controller 14b divides the fingerprint image into a plurality of unit blocks B. For further details, the fingerprint image is divided into a central region 20 and a peripheral region 30 in which a predetermined size with a predetermined number of unit blocks are established, respectively and then stores the divided fingerprint image to the video memory 14d, thereby acquiring the fingerprint image.

More in detail, when storing the fingerprint image to the video memory 14d after dividing it into a plurality of unit blocks B, as shown in FIG. 6, a fingerprint image is divided into the size of 8×6, thereby acquiring 48 unit blocks B all. To acquire more precise image, the fingerprint image outputted from the CCD device unit 4 can be divided into the size of 192×192 and stored to the video memory 14d. When storing the fingerprint image to the video memory 14d to the video memory 14d after dividing it into a plurality of unit blocks, a controller 14b divides the respective unit blocks B of a center region 20 of the fingerprint image into a predetermined number of subdivided blocks B1 and divides a peripheral region 30 into a unit block B, then stores the divided fingerprint image to the video memory 14d, thereby acquiring the fingerprint image (S13).

The center region 20 in the fingerprint image is a region which is contacted earliest of all when contacting the finger f on a surface of the fingerprint image sensing device unit 11 for detecting the fingerprint image fp, the region has a narrow interval between ridges. In the present invention, the center region 20 is set as at least one or more regions, such as a first and second center region 21 and 22, as shown in FIG. 6. Also, the unit blocks B included to the center regions 21 and 22 is subdivided again into at least two or more subdivided blocks B1 and then stored to the video memory 14d.

Figure 7:
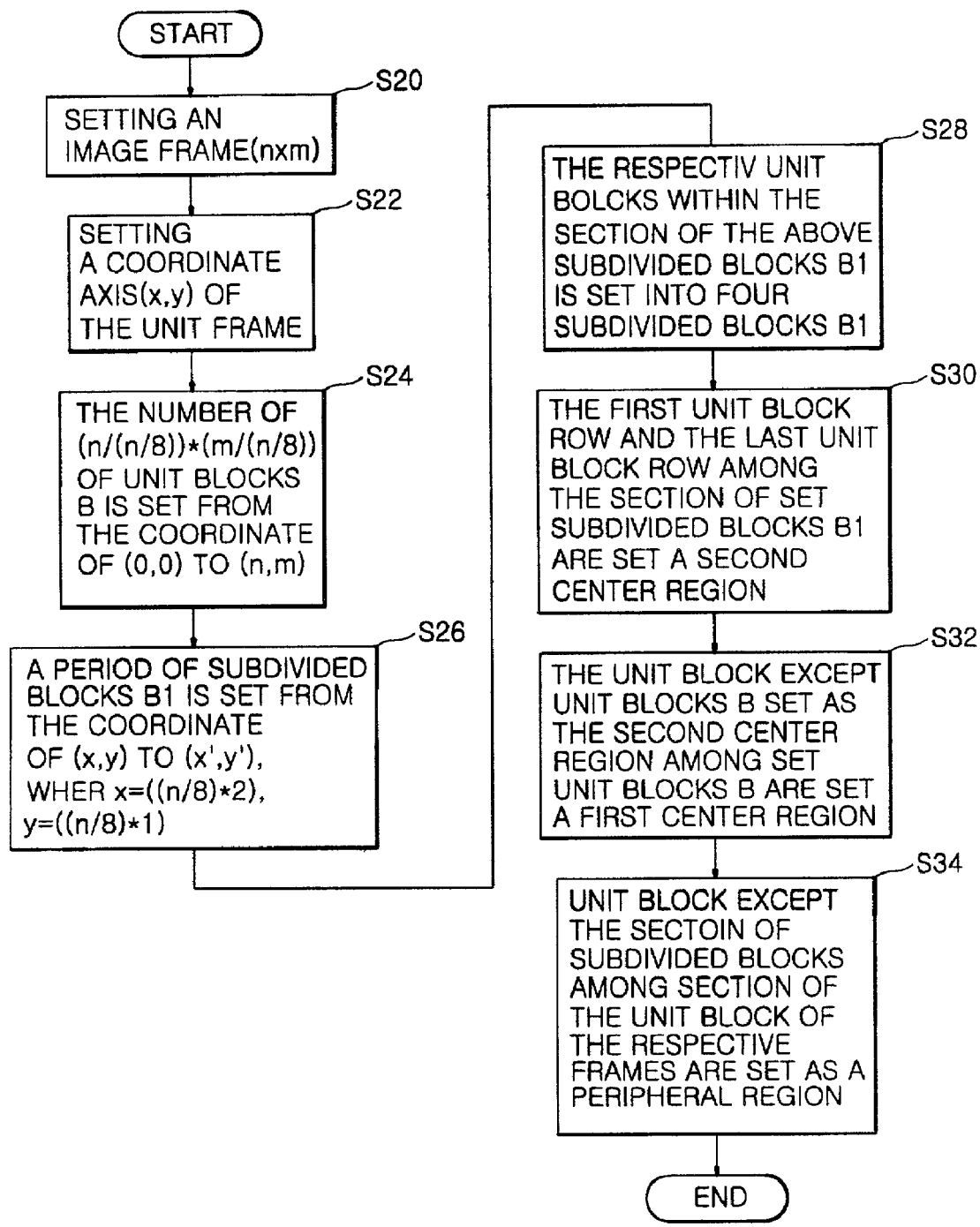
FIG. 7 is a flow chart illustrating a setting process of region of a fingerprint image in the fingerprint image acquisition method in accordance with the present invention.

On the other hand, FIG. 7 is a flow chart illustrating a setting process of region of a fingerprint image in the fingerprint image acquisition method in accordance with the present invention. As shown in FIG. 7, first, a predetermined size (n×m) of image frame is set (S20). Thereafter, a coordinate axis (x,y) of the unit frame is set (S22). Thereafter, the number of (n/(n/8))*(m/(n/8)) of unit blocks B is set from the coordinate of (0,0) to (n,m) (S24). Thereafter, a period of subdivided blocks B1 is set from the coordinate of (x,y) to (x',y'), where x=((n/8)*2), y=((n/8)*1) (S26). Thereafter, the respective unit blocks within the section of the above subdivided blocks B1 is set into four subdivided blocks B1 (S28). Thereafter, the first unit block row and the last unit block row among the section of set subdivided blocks B1 are set a second center region 22 (S30). Thereafter, the unit block except unit blocks B set as the second center region 22 among set unit blocks B are set a first center region 21 (S32). Thereafter, unit blocks except the section of subdivided blocks among section of the unit block of the respective frames are set as a peripheral region 30 (S34).

Figure 8A:
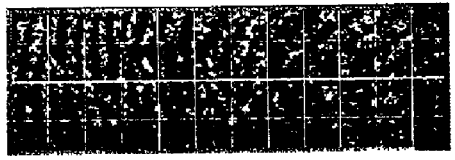
FIGS. 8a to 8c are views illustrating a fingerprint image before and after an improvement in fingerprint image acquisition process examined through a fingerprint image acquisition method, so called Dynamic Capture Algorithm.
Figure 8A:
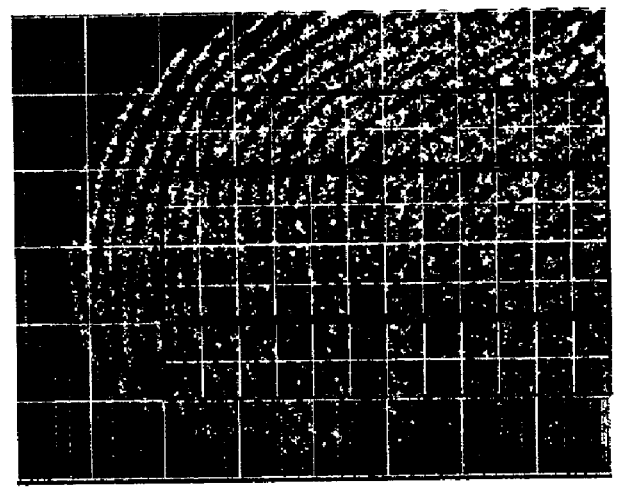
Figure 8A:
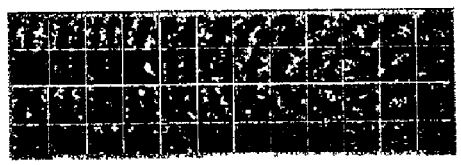
Figure 8A:
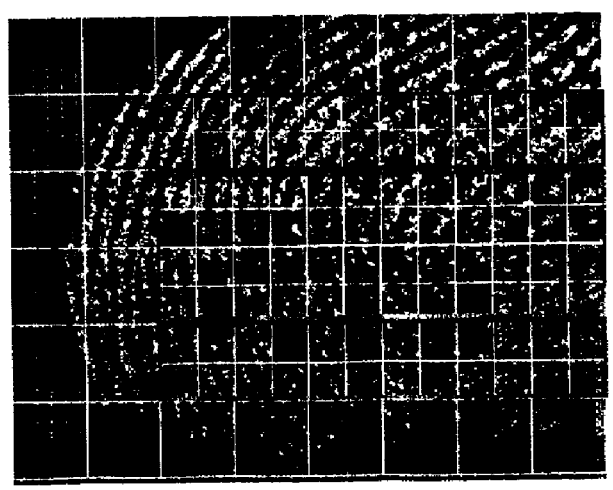
Figure 8B:
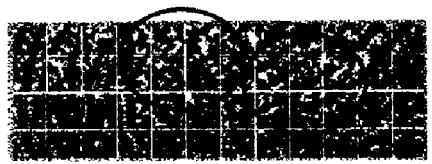
Figure 8B:
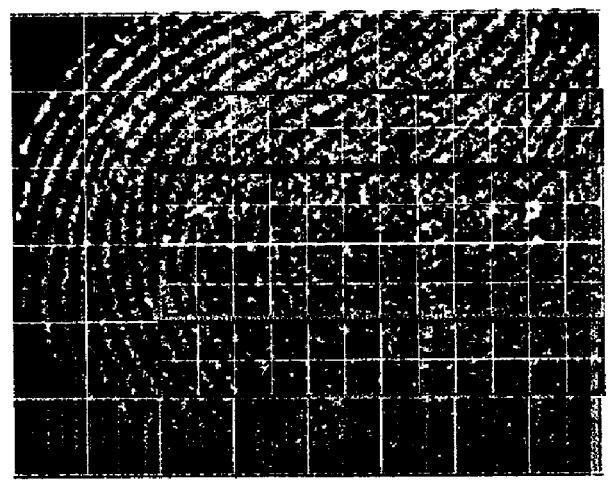
Figure 8B:
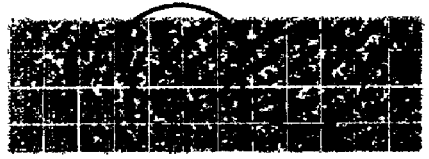
Figure 8B:
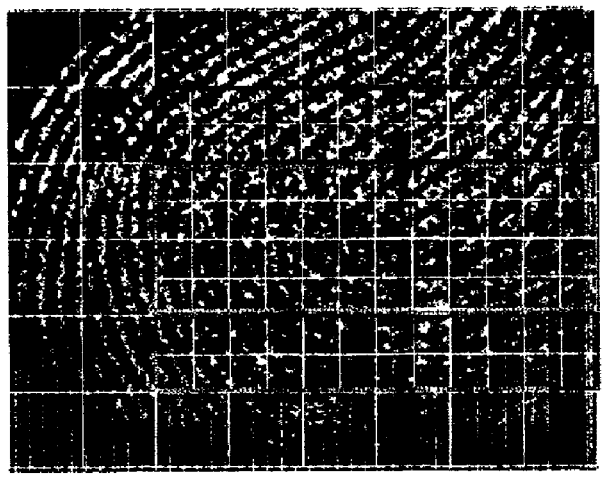
Figure 8C:
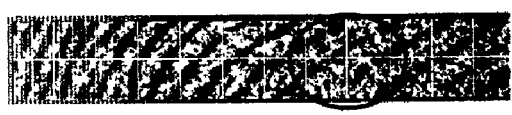
Figure 8C:
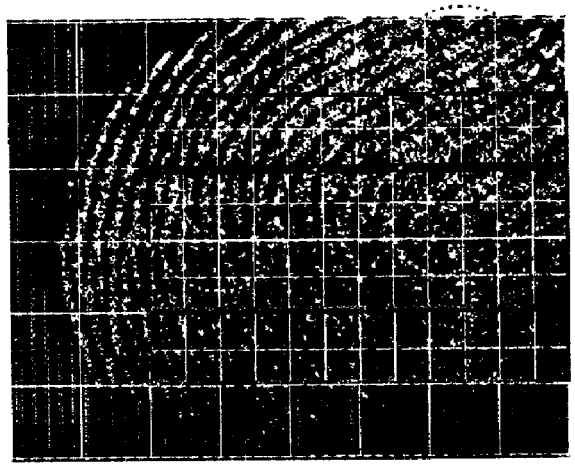
Figure 8C:
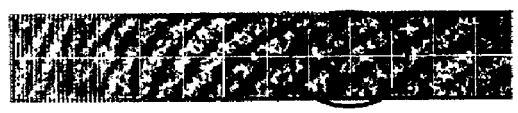
Figure 8C:
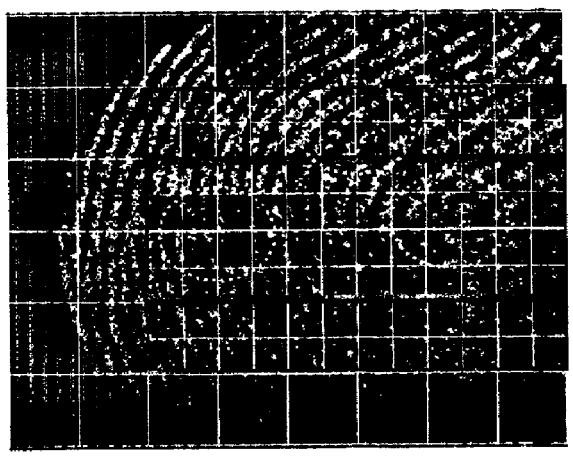

FIGS. 8a to 8c are views illustrating a fingerprint image before and after an improvement in fingerprint image acquisition process examined through a fingerprint image acquisition method, so called Dynamic Capture Algorithm. As shown in FIG. 8a, only the image of a specific region, i.e. only a center region, among the image before improvement is firstly inspected. According this, when the conventional fingerprint image acquisition method is used before the application of the present invention, or before the improvement, the distribution of valley(black) and ridge(white) is uneven and too much, so the normal formation of fingerprint is damaged. In contrast, only the image of a specific region, i.e. only a center region, among the image after improvement is inspected. According this, the distribution of valley (black) and ridge(white) is even and the fingerprint has a sine structure as a normal formation. In reference, when the distribution of black and white must be even and the amount of black and white is similar with each other, it is discriminated as an ideal fingerprint image.

FIG. 8b is a view illustrating a fingerprint image before and after an improvement which is similar to FIG. 8a. As shown in FIG. 8b, only the image of a specific region, i.e. only a center region, among the image before improvement is firstly inspected with an interested point(represented by a circle) as a central figure, it is founded that the image after the improvement applying the fingerprint image acquisition method according to the present invention is more clear than that of the distribution of the fingerprint image before the improvement.

FIG. 8c is a view illustrating a fingerprint image before and after an improvement which is similar to FIG. 8a. As shown in FIG. 8c, only the image of a specific region, i.e. only a center region, among the image before improvement is firstly inspected with an interested point(represented by a circle or a dotted circle) as a central figure, it is founded that the image after the improvement applying the fingerprint image acquisition method according to the present invention is more clear than that of the distribution of the fingerprint image before the improvement.

Figure 9A:
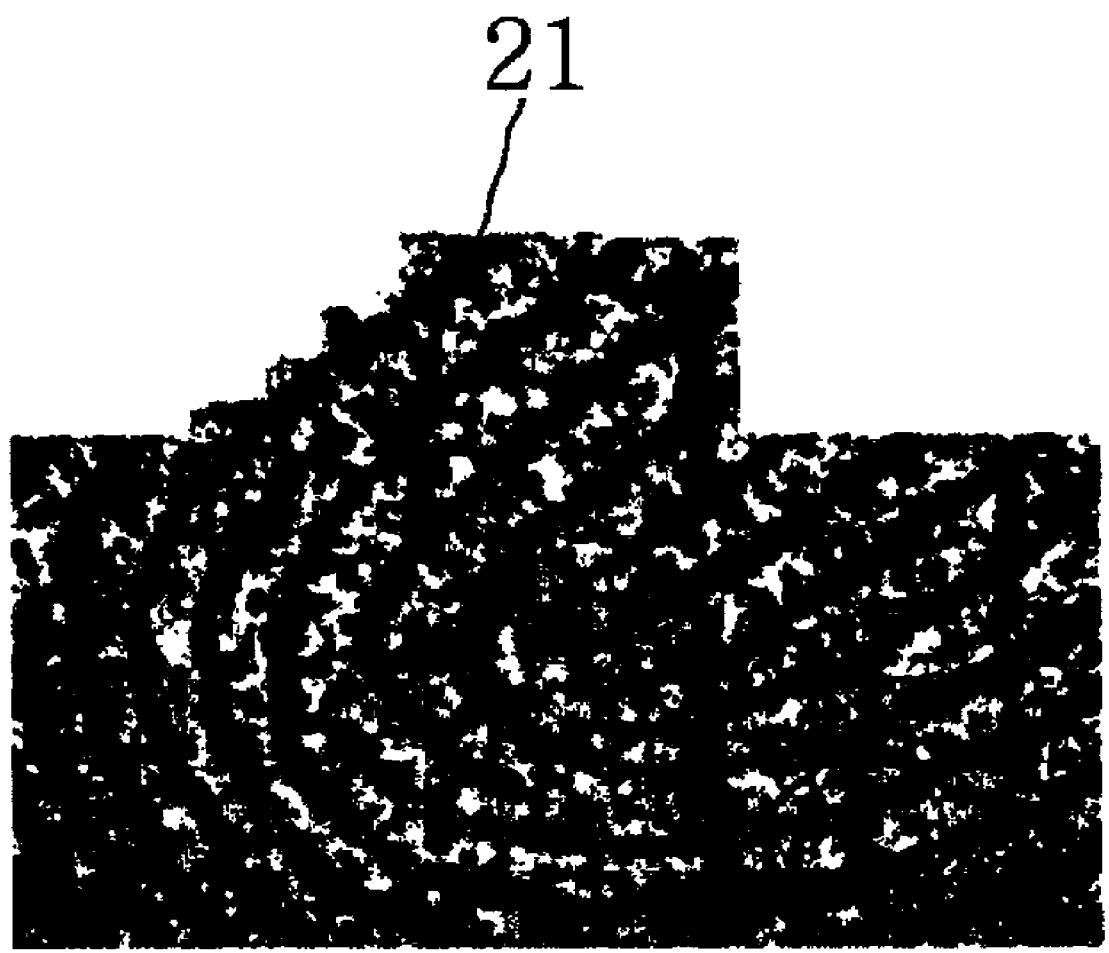
FIGS. 9a to 9d show photographs of fingerprint images acquired by using the fingerprint image acquisition method of FIG. 5.
Figure 9B:
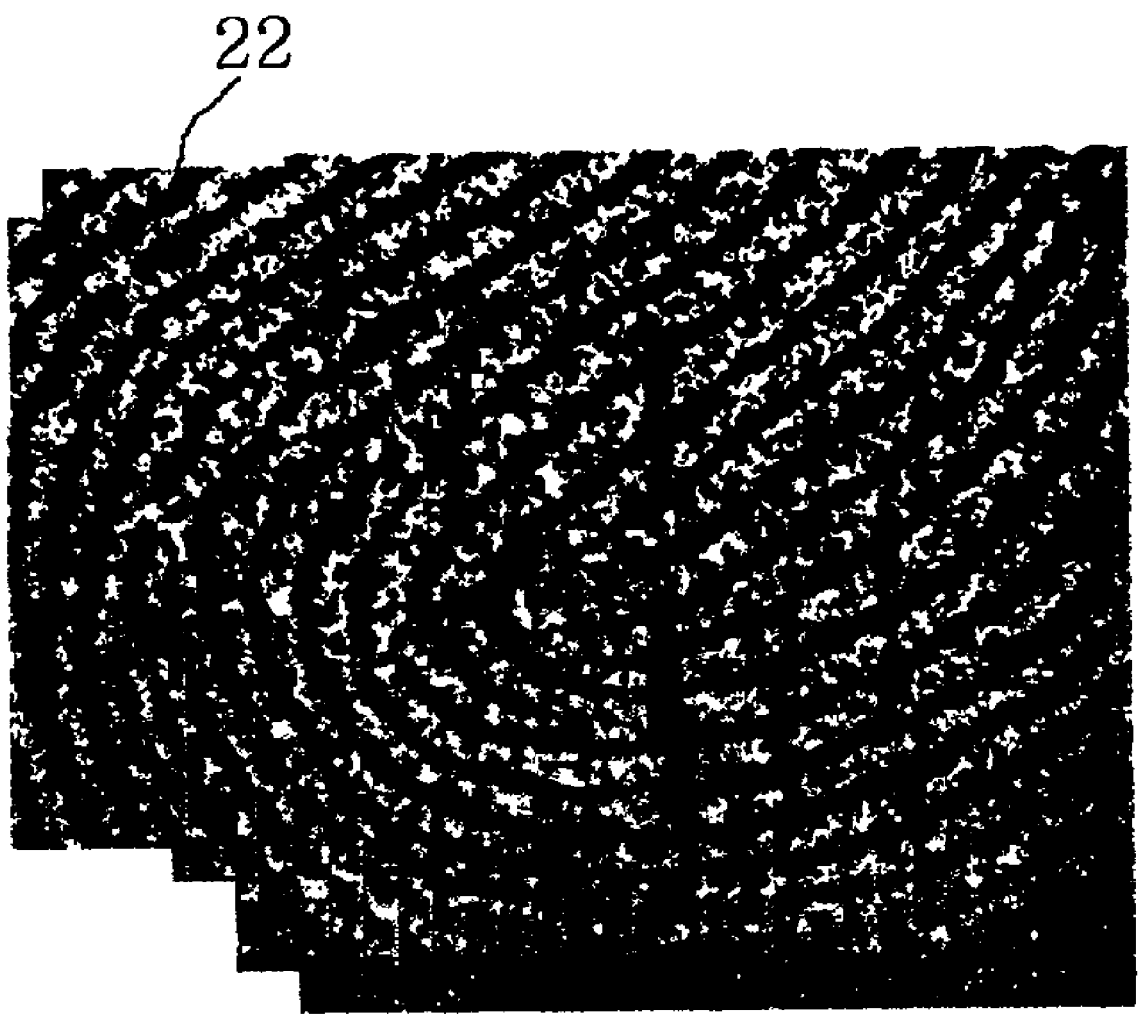
Figure 9C:
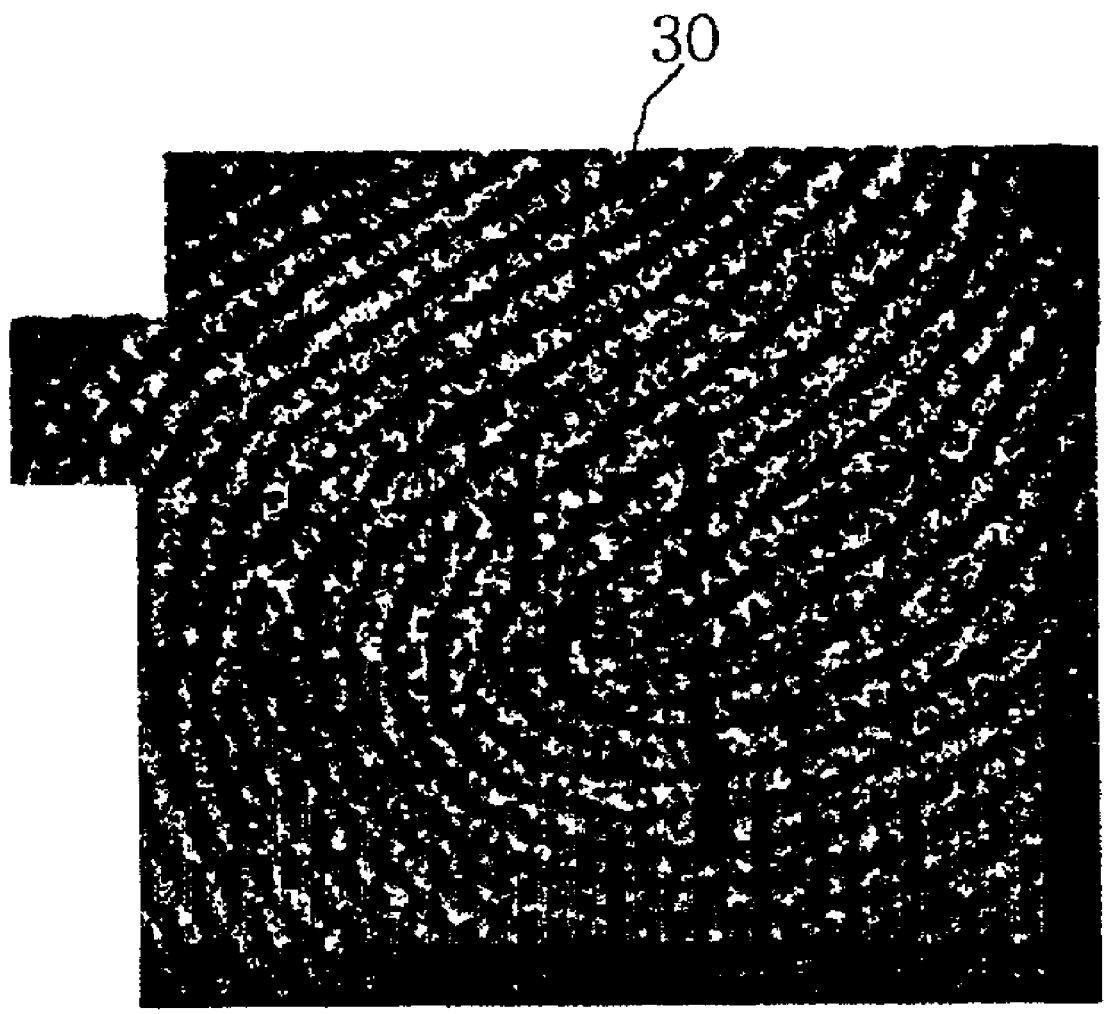
Figure 9D:
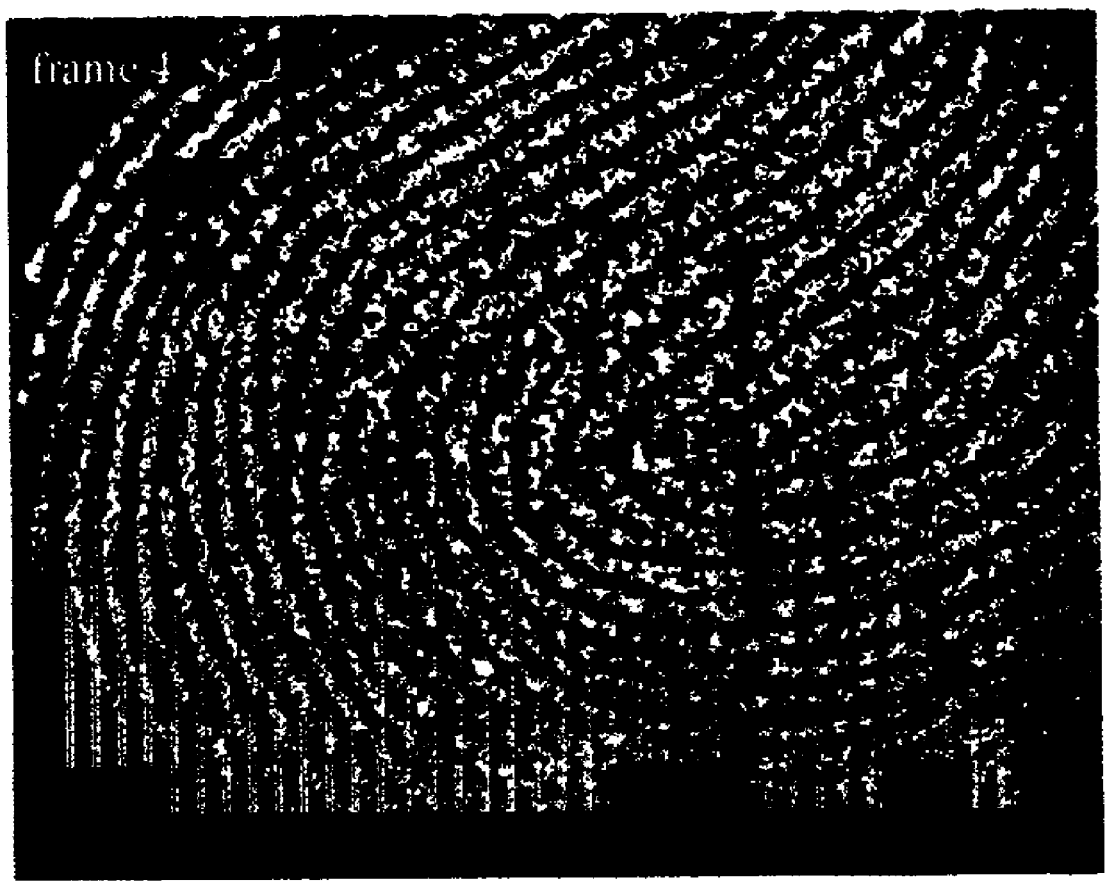

On the other hand, when storing the center region 20 of the fingerprint image to the video memory 14d, the unit block is subdivided into subdivided blocks B1 and thereafter stored to the video memory 14d as shown in FIGS. 9a and 9b. Thus, more clear image can be obtained at the center region 20 having narrow interval between ridges in comparison with the peripheral region 30. That is, the narrow interval between ridges at the center region 20 is corrected and the peripheral region 30 except the center region 20 is divided into conventional unit blocks B as shown in FIG. 9c and then stored to the video memory 14d, thereby obtaining the fingerprint image dynamically, as a result, capable of obtaining the clear fingerprint image as shown in FIG. 9d.

As above, in the present invention, when acquiring the fingerprint image, the center region having narrow interval between ridges and the peripheral region having wide interval between ridges are differentiated, the unit block of the center region is subdivided finely than that of the peripheral region, thereby capable of obtaining more clear fingerprint image.

Although the present invention has been described in terms of a particular embodiment, it is not intended that the invention be limited to this embodiment. Modifications within the spirit of the invention will be apparent to those skilled in the art.

What is claimed is:

1. A fingerprint image acquisition apparatus including a fingerprint sensing device unit, a CCD device unit, and an image processing unit, the image processing unit comprising:

an A/D converting unit for converting and outputting the fingerprint image outputted from the CCD device unit into a digital signal;

an image buffer for storing the digital signal from the A/D converting unit; and a controller for watching a state of the image buffer to determine whether the fingerprint image is inputted and stored to the image buffer, and for storing the fingerprint image to a video memory if the storage of the fingerprint image is confirmed, wherein the controller is configured to:

execute a process for dividing the fingerprint image into a plurality of unit blocks with a predetermined size; and execute a process for dividing the fingerprint image into a center region and a peripheral region, each including a predetermined number of unit blocks, and for subdividing each unit block of only the center region into at least two subdivided blocks.

2. The apparatus of claim 1, wherein the controller is configured to divide the fingerprint image into 48 unit blocks in a 6×8 matrix.

3. The apparatus of claim 1, wherein the center region is set into at least one region.

4. The apparatus of claim 1, wherein the center region comprises a second center region in which the first unit block row and the last unit block row among the section of set subdivided blocks are set and a first center region in which the remaining subdivided unit blocks are set.

5. A fingerprint image acquisition apparatus including a fingerprint sensing device unit, a CCD device unit, and an image processing unit, the image processing unit comprising:

an A/D converting unit for converting and outputting the fingerprint image outputted from the CCD device unit into a digital signal;

an image buffer for storing the digital signal from the A/D converting unit; and a controller for watching a state of the image buffer to determine whether the fingerprint image is inputted and stored to the image buffer, and for storing the fingerprint image to a video memory if the storage of the fingerprint image is confirmed, wherein the controller is configured to:

execute a process for setting a size of the fingerprint image frame;

execute a process for dividing the fingerprint image into a plurality of unit blocks with a predetermind size;

execute a process for setting a section of predetermined subdivided blocks;

execute a process for dividing the fingerprint image into a predetermined number of center regions, wherein each center region includes a predetermined number of the subdivided unit blocks; and execute a process for dividing the fingerprint image into a peripheral region including a predetermined number of non-subdivided unit blocks.

6. The apparatus of claim 5, wherein the controller is also configured to divide only the unit blocks in a center region into at least two or more subdivided blocks.

7. The apparatus of claim 5, wherein the center region is set into at least one region.

8. The apparatus of claim 5, wherein the center region comprises a second center region in which the first unit block row and the last unit block row among the section of set subdivided blocks are set and a first center region in which the remaining subdivided unit blocks are set.

9. A fingerprint image acquisition method comprising the steps of:

confirming whether the fingerprint image generated by contacting a finger on a surface of a fingerprint sensing device unit is inputted and stored to an image buffer;

dividing the fingerprint image into a predetermined number of unit blocks if it is confirmed that the fingerprint image is stored to the image buffer;

setting the divided fingerprint image into a center region and a peripheral region, each region having a predetermined number of unit blocks, and subdividing the respective unit blocks of only the center region into a predetermined number of subdivided blocks; thereby obtaining the differentiated images at the center region and the peripheral region.

10. The method of claim 8, wherein each unit block of the center region of the fingerprint image is divided into at least two or more subdivided blocks.

11. The method of claim 8, wherein the center region is set as at least one or more region.

12. The method of claim 8, wherein the center region comprises a second center region in which the first unit block row and the last unit block row among the section of set subdivided blocks are set and a first center region in which the remaining subdivided unit blocks are set.

13. A fingerprint image acquisition method comprising the steps of:

confirming whether a fingerprint image generated by contacting a finger on a surface of a fingerprint sensing device unit is inputted and stored to an image buffer;

setting a size of a fingerprint image frame if it is confirmed that the fingerprint image is stored to the image buffer;

dividing the fingerprint image into a plurality of unit blocks with a predetermined size;

setting a predetermined subdivided block section;

dividing the fingerprint image into a predetermined size of center region including a predetermined number of subdivided unit blocks;

dividing the fingerprint image into a peripheral region including a predetermined number of unit blocks that are not subdivided.

14. The method of claim 12, wherein each unit block of the center region of the fingerprint image is divided into at least two or more subdivided blocks.

15. The method of claim 12, wherein the center region is set as at least one or more region.

16. The method of claim 12, wherein the center region comprises a second center region in which the first unit block row and the last unit block row among the section of set subdivided blocks are set and a first center region in which the remaining subdivided unit blocks are set.

* * * * *